United States Patent

[11] 3,610,927

[72] Inventor Donald C. Hausser
 Chicago, Ill.
[21] Appl. No. 541,763
[22] Filed Apr. 11, 1966
[45] Patented Oct. 5, 1971
[73] Assignee Nuclear-Chicago Corporation
 Des Plaines, Ill.

[54] SAMPLE-HANDLING MECHANISM FOR LIQUID SCINTILLATION COUNTING APPARATUS
 9 Claims, 11 Drawing Figs.
[52] U.S. Cl. .................................................. 250/71.5, 250/106 SC
[51] Int. Cl. .................................................. G01t 1/20
[50] Field of Search ............................................. 250/71.5, 106 SC; 74/53, 54

[56] References Cited
UNITED STATES PATENTS
2,271,019 1/1942 DeMatt ........................ 74/53
3,283,151 11/1966 Rowan et al. .................. 250/71.5

*Primary Examiner*—Ralph G. Nilson
*Assistant Examiner*—Morton J. Frome
*Attorney*—Leonard G. Nierman ABSTRACT: The mechanism of an automatic liquid scintillation counting system employs a cam-driven lever arm to position the elevator to form a vertically compact elevator drive suitable for tabletop use. Precision positioning of samples in the counting position is accomplished at relatively low cost without impairment of reliability by the cam-drive construction which controls the time of operation of the mechanical elements of the system. The light-seal shutter portion of the cam-drive prevents damage due to jamming and jammed samples are detected by abnormality of the camming action thus produced.

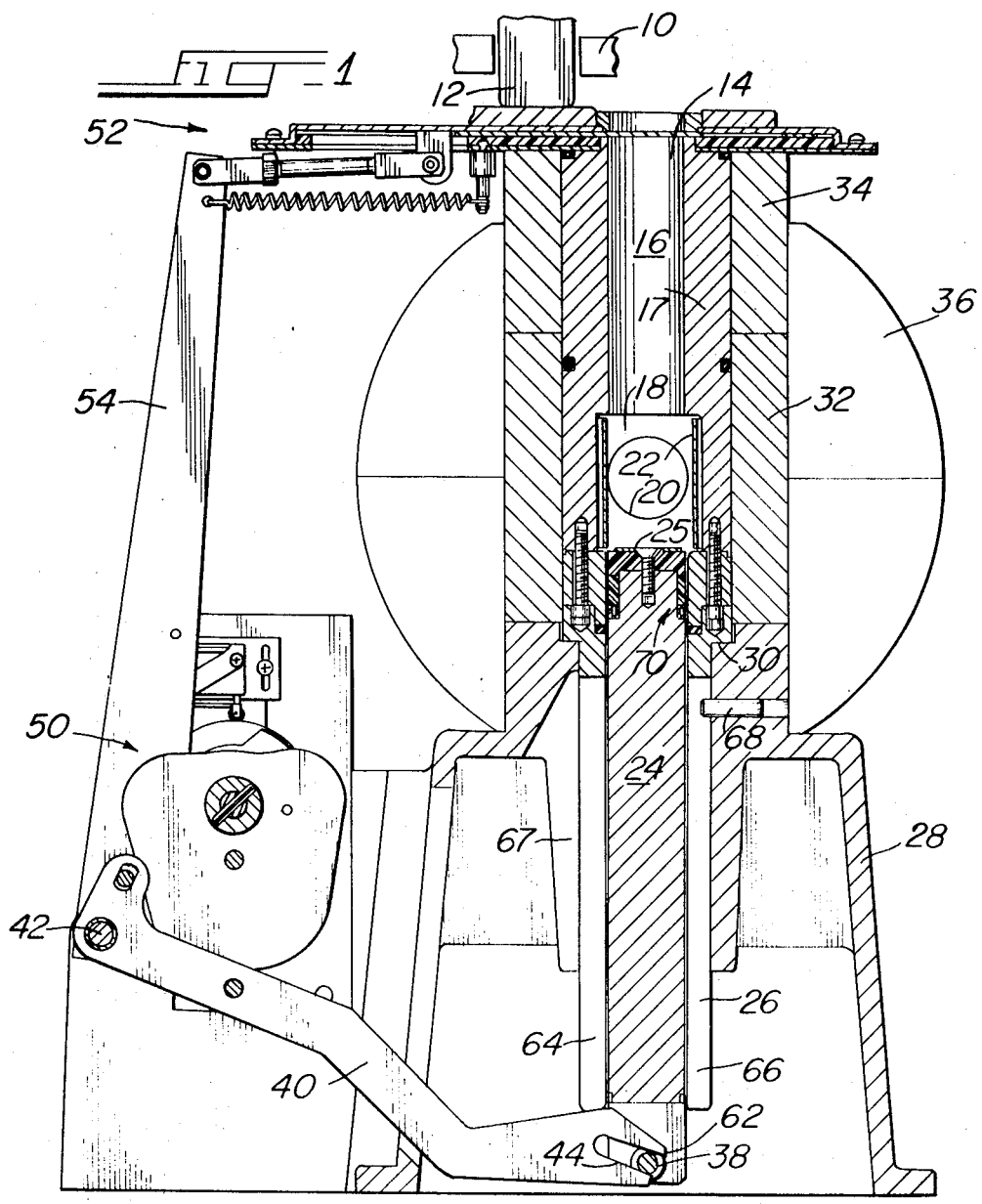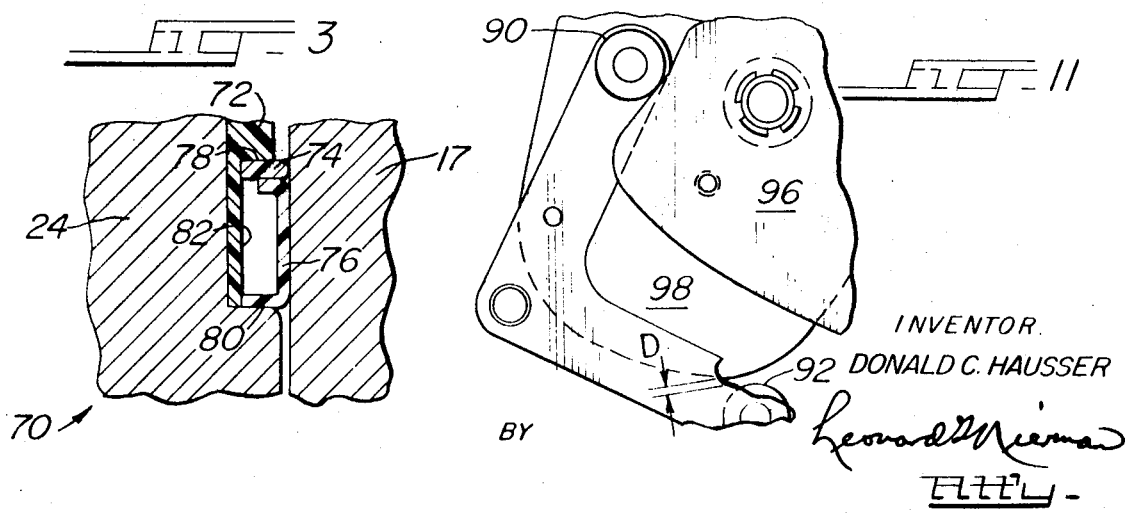
INVENTOR.
DONALD C. HAUSSER

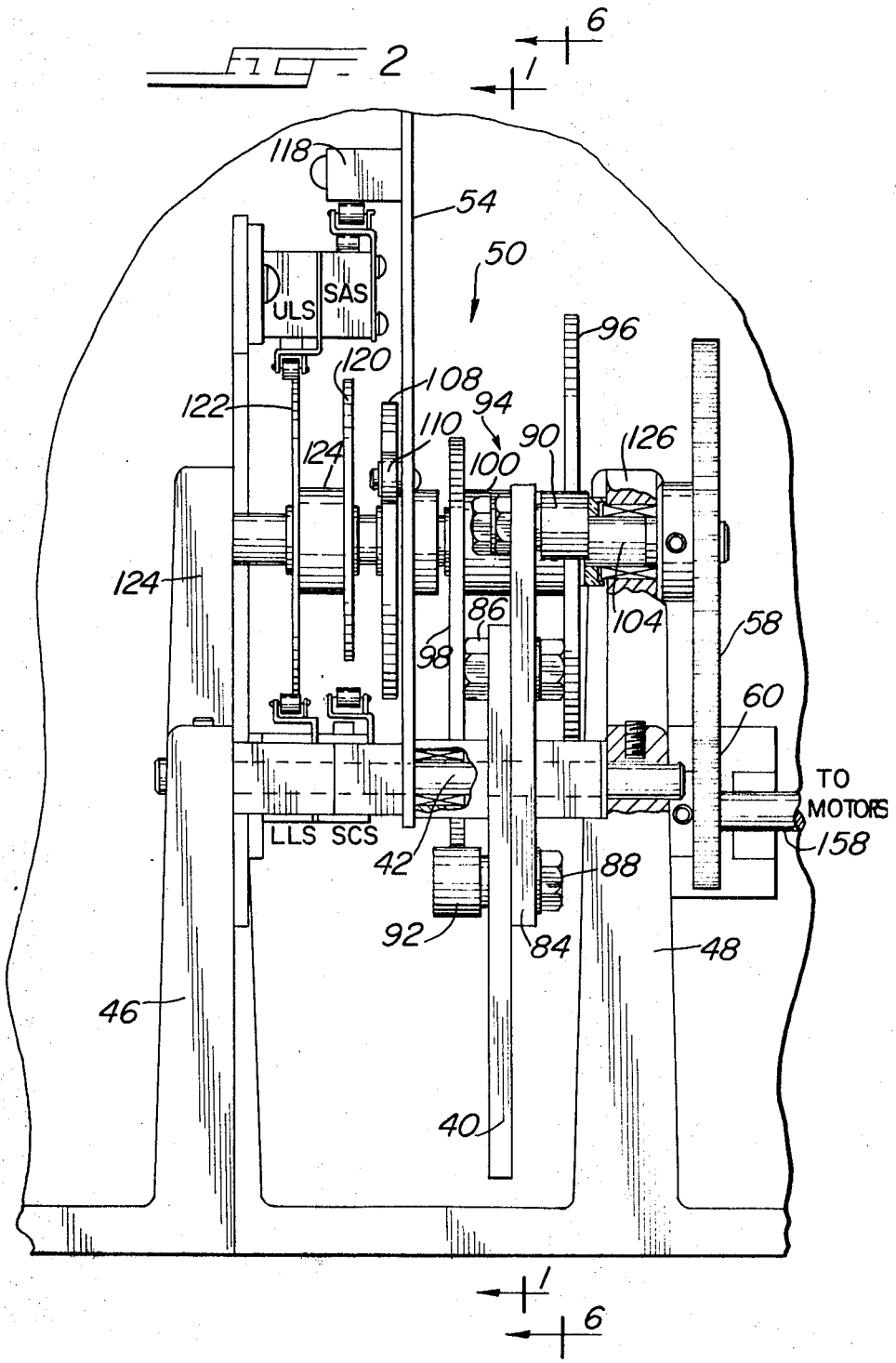

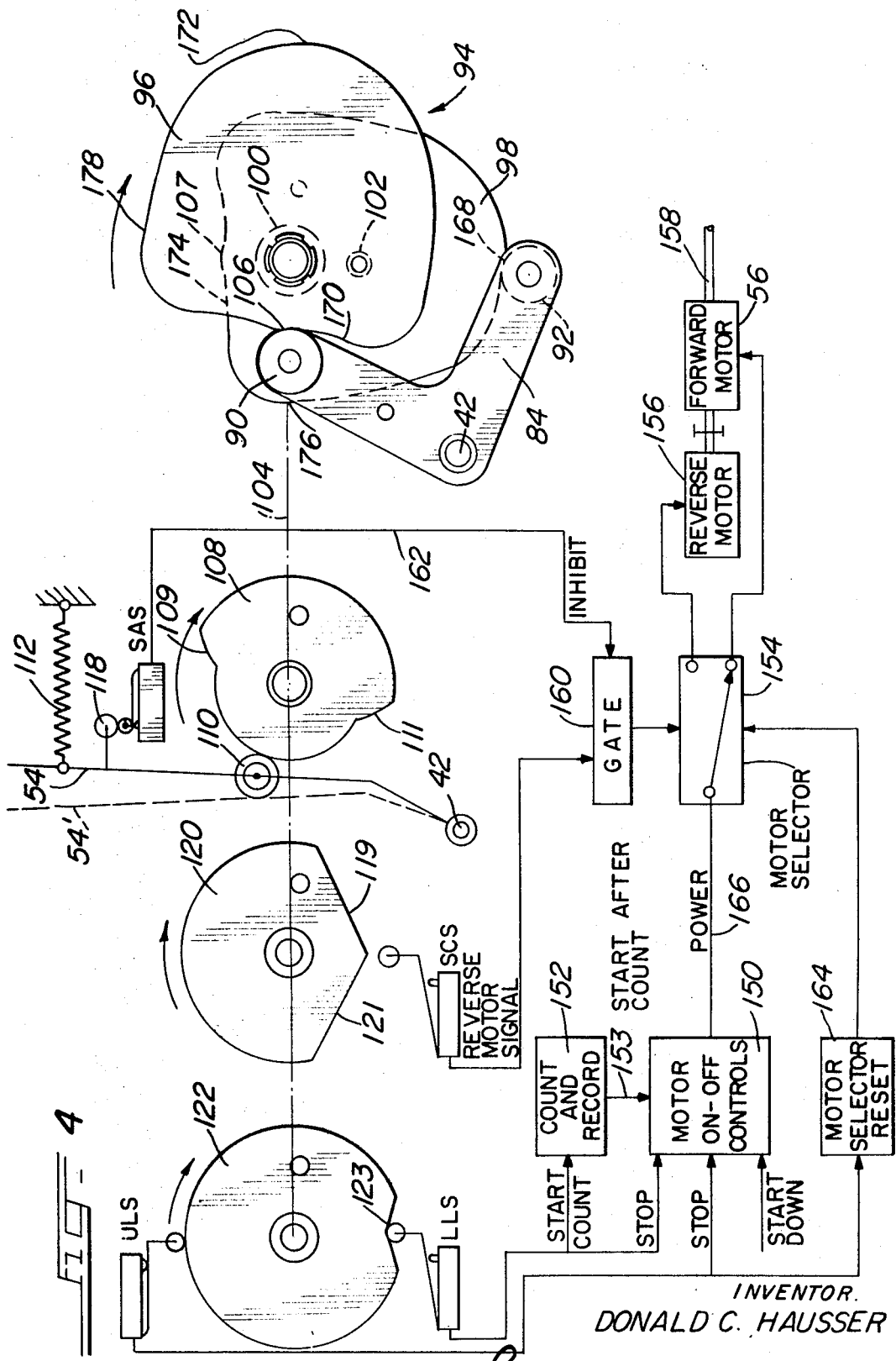

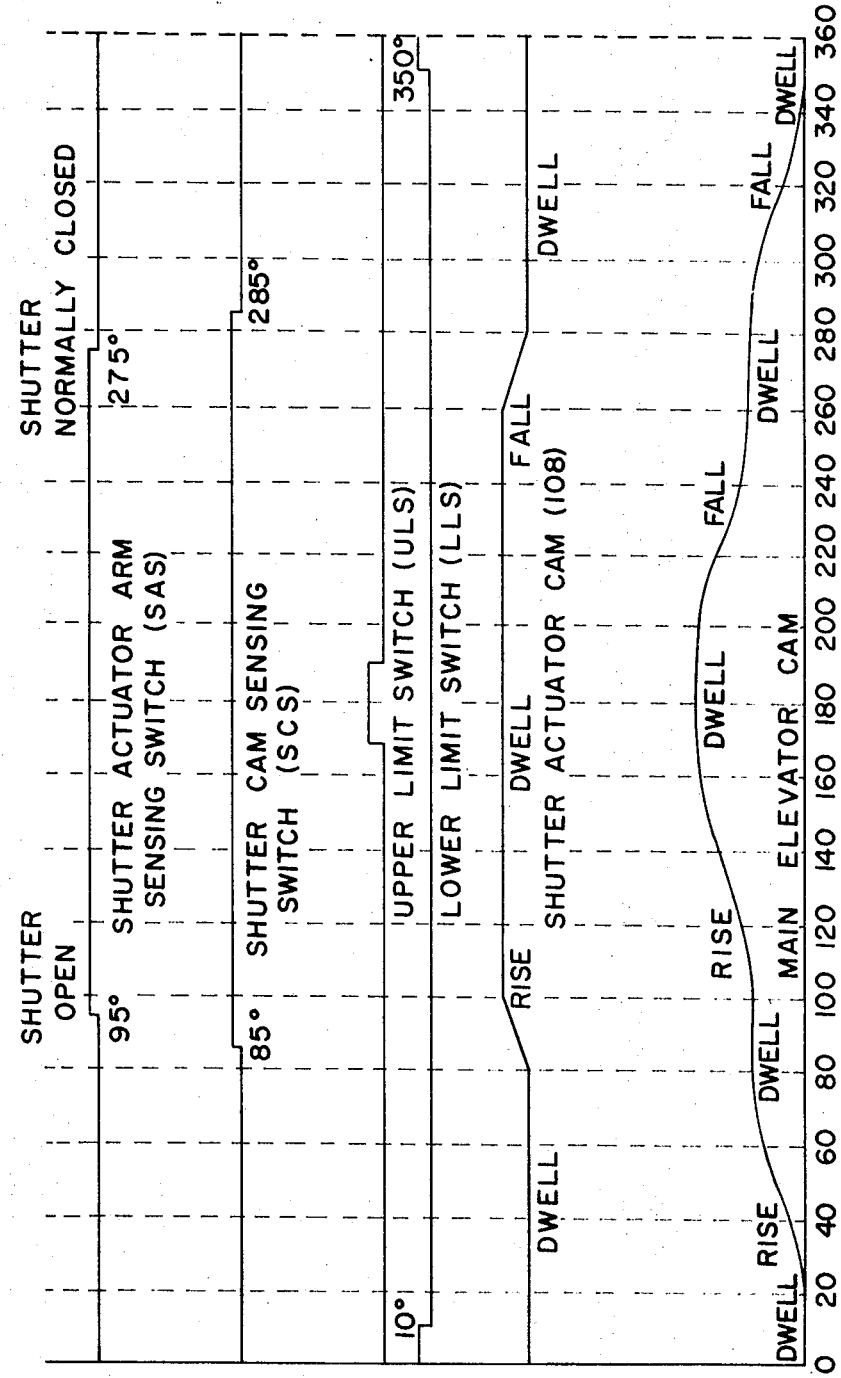

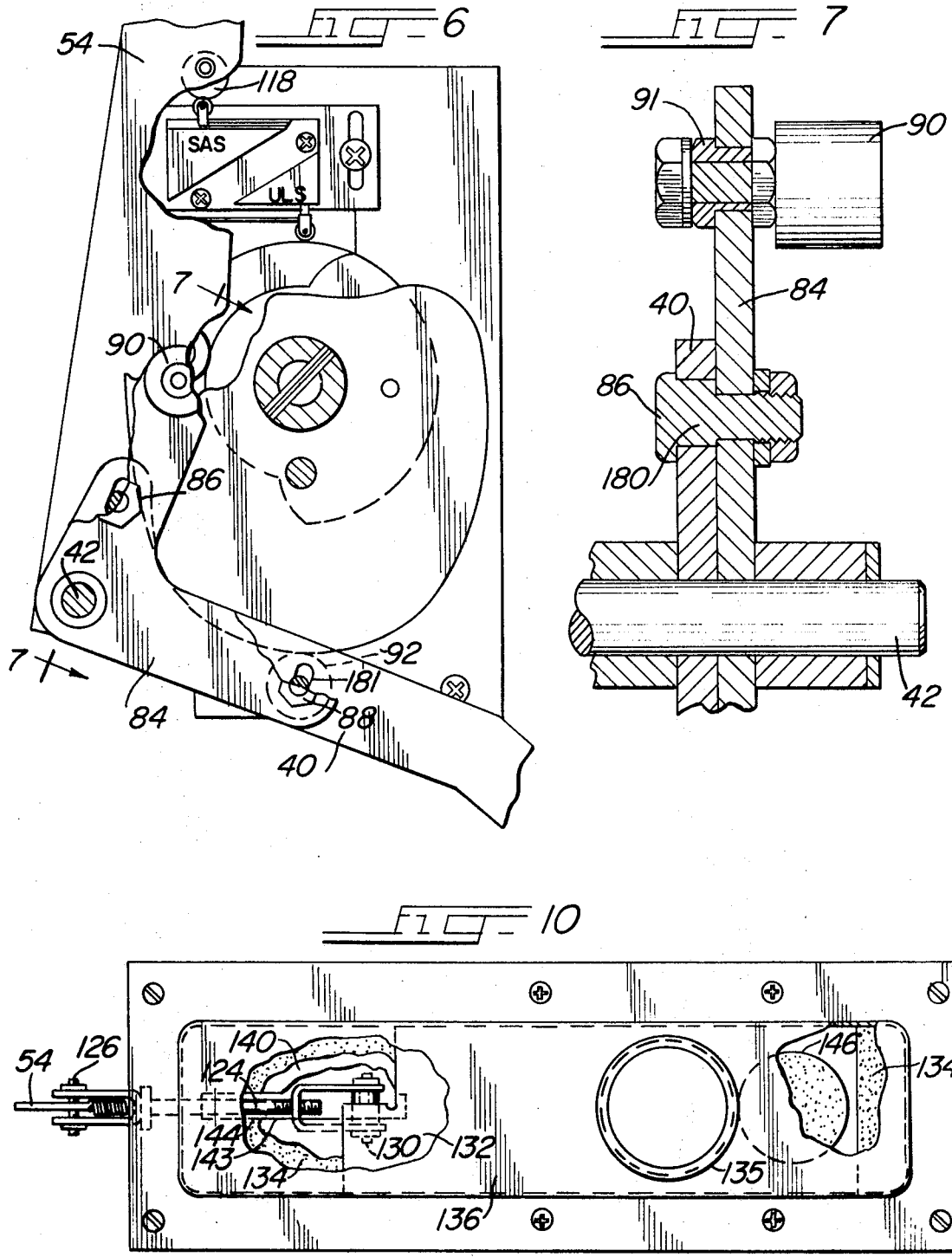

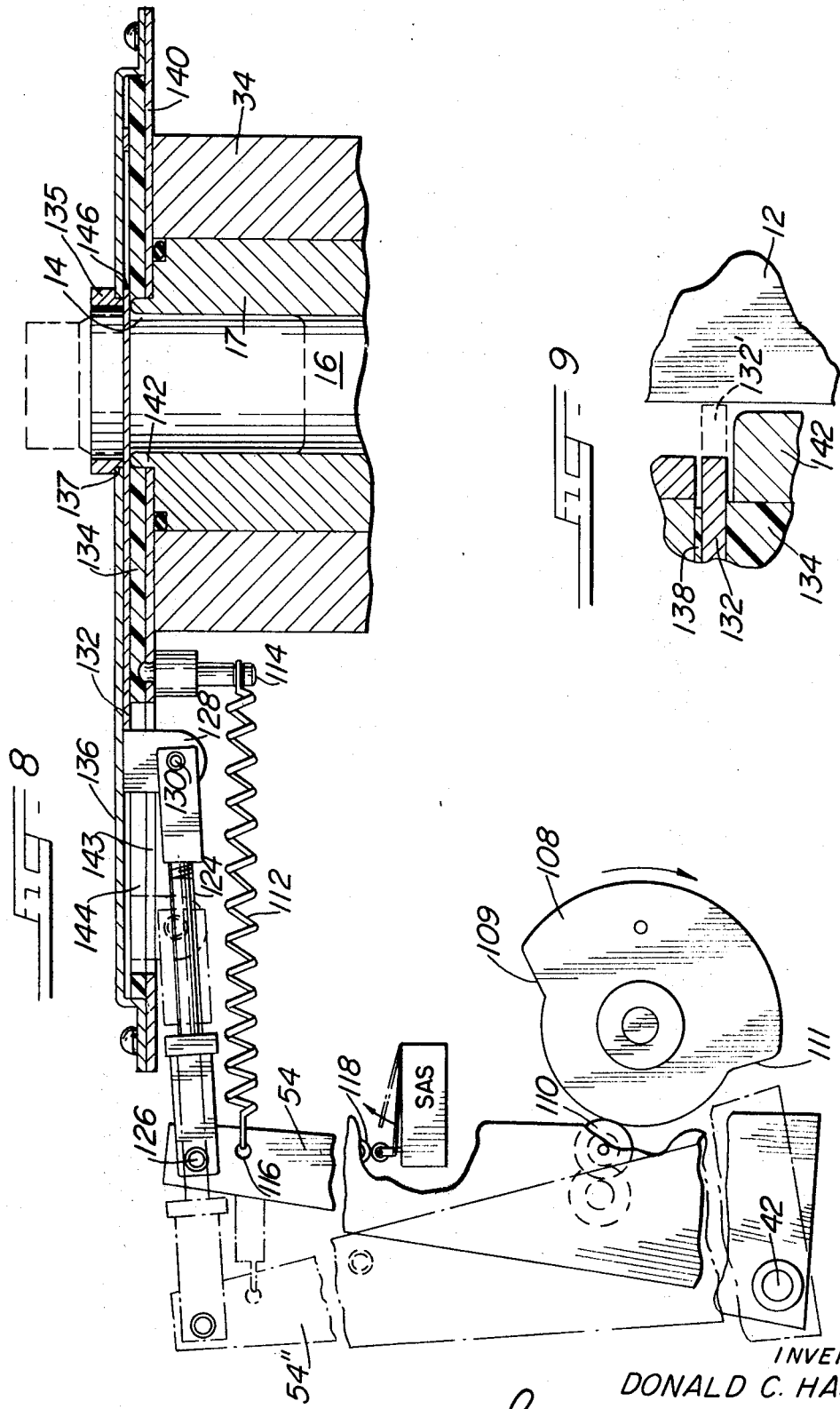

3,610,927

1

SAMPLE-HANDLING MECHANISM FOR LIQUID SCINTILLATION COUNTING APPARATUS

The present invention relates to apparatus for the measurement of the activity of radioactive samples, and more particularly to sample-handling mechanisms of the type used in inserting and removing samples into and from the counting chamber of liquid scintillation counting equipment.

In the making of liquid scintillation measurements the scintillating composition, in a suitable bottle or vial, is placed within a highly shielded light-tight chamber adjacent to photomultipliers. In mechanized equipment, the sample is normally lowered into the chamber on an elevator. A light-sealing shutter is employed near the top of the stroke of the elevator, and provision is usually made for an auxiliary light seal established between the elevator and its surrounding passage to block light from the chamber while the shutter is open to prevent damage to the highly sensitive photomultipliers. Exact and completely reproducible positioning of each sample vial with respect to the photomultipliers is important to the measurement, any deviation resulting in variations in efficiency of measurement.

It is the principal object of the present invention to provide a simple and inexpensive sample-handling mechanism for liquid scintillation counting which has a compact structure suitable for incorporation in a tabletop type of cabinet, without degradation as regards standards of operating performance.

The mechanism provided by the invention is simple and reliable in construction and operation and performs a number of functions heretofore introducing substantial complexity of structure and adjustment in a fully accurate and dependable manner.

The invention is most readily understood in both its general principles of construction and in its more detailed features from consideration of the embodiment illustrated in the attached drawing, in which:

FIG. 1 is a vertical sectional view of a liquid scintillation counting device according to the invention, taken along the line 1—1 of FIG. 2 in the direction indicated by arrows;

FIG. 2 is a fragmentary view in elevation of the device of FIG. 1, showing a camming assembly used therein;

FIG. 3 is a highly magnified view in section of an elevator light-seal assembly shown in FIG. 1, with an elevator used therein partially raised;

FIG. 4 is a schematic diagram of the various mechanical cam, timing and drive provisions of FIG. 2, with certain electrical control circuits shown in block form;

FIG. 5 is a timing diagram of the structure shown schematically in FIG. 4;

FIG. 6 is a fragmentary view in vertical section taken along the line 6—6 of FIG. 2;

FIG. 7 is a fragmentary section taken along the line 7—7 of FIG. 6 in the direction indicated by the arrows;

FIG. 8 is a view partially in section and partially in elevation corresponding generally to an enlarged portion of FIG. 1, showing a shutter drive mechanism;

FIG. 9 is a highly magnified portion of FIG. 8 showing the end portion of the shutter in open position with a jammed position shown in phantom;

FIG. 10 is a top view of a shutter assembly shown in FIG. 8 with various portions broken away to show the details of construction; and FIG. 11 is a fragmentary view of an elevator cam and follower assembly shown in a somewhat rotated position from that illustrated in FIG. 4.

Referring first to FIG. 1, a conveyor 10 is diagrammatically shown as bearing a sample bottle or vial 12, the bottom of which slides on a table surface, the conveyor depositing each successive vial to a position adjacent an aperture 14 located at the upper end of a passage 16 defined by a cylindrical housing 17. The passage 16 terminates at the lower end thereof in a chamber 18 which is adapted to receive the sample vial 12 for the scintillation measurement. The chamber 18 houses a light

2 reflector assembly 22 and photomultipliers 20. A vertically disposed ram or elevator 24 having a platform cap 25 at the top carries successive sample vials from the conveyor to the chamber and returns them on completion of the measurement. The ram 24 is guided by a tubular bearing member 26 which is supported in a frame or stand 28, on an internal shoulder 30. The stand 28 also supports the passage-defining member 17 as well as structural and shielding members 32 and 34 and surrounding lead shielding 36. The lower end of the ram 24, in its lowermost position has a relatively small clearance from the bottom panel of an outer housing (not shown) which may rest on a table or similar supporting surface.

The lower end of ram 24 bears a drive pin 38. A lever arm 40, pivoted about an axle 42 near its outer end, has a slot 44 on the inner end which engages the pin 38 for vertically driving the ram 24. The axle 42, as shown in FIG. 2, is supported by frame structures 46 and 48 which form a unitary part of the metal stand 28 for rigidity.

The lever 40 is driven by a set of elevator drive cams which are a part of the elevator and shutter drive and timing mechanism indicated generally at 50 in FIGS. 1 and 2. The shutter and actuator assembly indicated generally at 52 in FIG. 1 is driven by the mechanism 50 through the shutter drive arm 54 which is bearing-mounted at its lower end on the same fixed axle 42 as the lever 40 which drives the elevator.

The rotation of the drive cams 50 by a suitable electric motor 56 (illustrated only in the diagram of FIG. 4) through a suitable gear train 58 and 60 produces sequenced motions of the elevator drive arm 40 and the shutter drive arm 54 about the axle 42 in a manner which will be discussed in detail hereinafter.

Vertical slots 64 and 66 in the guide and bearing member 26 and 67 in the stand structure 28 pass the lever arm 40 as it drives the elevator ram 24, with proper alignment maintained by a pin 68.

The elevator light-seal assembly indicated generally as 70 in FIG. 1 and shown in detail in FIG. 3 is located at the upper portion of the elevator ram 24. It comprises a resilient rubber-like ring 76 having a generally U-shaped cross section wherein one leg of the U has a greater length than the other, the ring being disposed about a circumferential portion of the ram in such a manner that the relatively longer leg rests on a shoulder portion 80 of the ram 24 abutting the surface 82 of the ring 72 which is composed of Delrin or any other suitable plastic. A further ring 74 is tightly pressed radially between the surface 82 and the passage wall 17 and vertically between a shoulder 78 on ring 72 and the shorter leg of the U-shaped ring 76. The light-seal is made leakproof by pressure against the passage wall 17 such that friction prevents the ram 24 from moving downwardly by its own weight, thus requiring an external driving force to move the elevator downwardly as well as upwardly.

The elevator drive arm 40 has secured thereto a bell crank 84, as shown in FIGS. 2 and 6, which is bearing-mounted at its apex on the axle 42 and is adjustably locked to the elevator arm 40 by an eccentric fastener 86 on the upper arm of the bell crank and a fastener 88 on the lower arm of the bell crank. Located on the extreme end of each arm of the bell crank 84 is a cam-follower roller 90 and 92, extending in opposite directions and adapted to engage respective ones of two camming surfaces of a conjugate cam 94 as best seen in FIGS. 2 and 4. The upper roller 90 is fixed to the bell crank 84 by an eccentric bushing 91 (FIG. 7) for reasons which will later become apparent.

The conjugate cam assembly 94, which drives the lever 40 and elevator ram 24, comprises a pair of cams 96 and 98 rigidly fastened together and maintained in spaced parallel relation by a collar 100 and a staking pin 102. FIG. 4 schematically illustrates the shape and time relation of each of the cams of FIG. 2, with their respective followers and switch-actuators, the drive shaft 104 being indicated by a dotted coupling of the cams. The double cams 96 and 98 are similar in shape and angularly displaced with respect to each other. The bell crank 84 maintains the follower rollers 90 and 92 on each arm thereof a fixed distance apart independent of the rotation of the cam 94. The shape and orientation of cams 96 and 98 and rollers 90 and 92 will be explained hereinafter in connection with the discussion of the mechanism operation.

Adjacent to the cams 96 and 98 along the drive shaft 104 is a shutter actuator cam 108 which engages a follower roller 110 fixed to the shutter actuator arm 54, shown schematically in FIG. 4 with this reference numeral in the closed position of the shutter and at 54' in the open position of the shutter. As shown in the elevational view of FIG. 8 and schematically in FIG. 4 a spring 112 is attached at one end to a fixed post 114 and at the other end to the shutter actuator arm 54, by means of an aperture 116. The spring normally maintains the follower wheel 110 in continuous engagement with the cam 108. A switch actuating member or roller 118 is attached to the shutter actuator arm 54 and is adapted to actuate a shutter arm sensing switch SAS as shown in FIGS. 2, 6 and 8 and schematically in FIG. 4 (for purposes later to be described).

Positioned on the drive shaft 104 is a shutter timing cam 120, the rotation of which is adapted to actuate a shutter cam sensing switch SCS by one portion 119 and to deactuate the switch in other regions 121 of the cam. On the drive shaft is a further cam member 122 which is adapted to actuate an upper limit switch ULS and a lower limit switch LLS on disengagement of their roller arms by a depressed camming surface 123. Each end of the drive shaft 104 is journaled in a frame member 124 and 126.

Referring now to FIGS. 8 and 10 which together illustrate the construction of the shutter and shutter drive assembly, a turnbuckle adjusted yoke assembly 124 is pivotally coupled at one end to the top of the shutter actuator arm 54 by means of a pin 126 and at the other end to a tab 128 by means of a pin 130. The tab 128 is integral with the shutter blade 132 and is bent normal thereto. The shutter blade 132 is slidably mounted on a pad of polyurethane foam 134 having a black velvet facing (not shown separately) against the shutter blade 132 to provide a low-friction light-absorbing surface. The foam provides a resiliency holding the shutter blade against the lower surface of an upper metal cover member 136, the underside of which has disposed thereon several laterally spaced longitudinal strips of Teflon tape, as shown in FIG. 9, to provide a low-friction sliding surface. The upper cover member 136 has a collar 135 pressed into an aperture 137 to guide sample vials into the passage aperture 14. A metal plate member 140 is fastened to the upper end of the metal cylindrical structures 17 and 34 and has an aperture therein which seats it on an annular shoulder around the entrance 14 to the passage 16. The plate 140 mounts the pad 134, the shutter blade 132 and the outer metal cover 136, as well as the spring-tension post 114. A slot 143 is provided in the supporting plate 140 in register with a slot 144 in the pad 134 to permit the reciprocating motion of the tab 128 moving the shutter blade 132 from one extreme position to the other. Open-shutter condition is provided by an aperture 146 at the outer end of the shutter blade 132 having a diameter adapted to register with the upper end of the passage 16. When the shutter is in its closed position the aperture 146 is entirely over the pad 134 and the solid shutter blade portion is in light-sealing engagement with the black velvet in the region about the aperture 14 as shown in the broken away portions of FIG. 10, while in the open position of the shutter the aperture 146 is in concentric relation to the aperture 14 of the passage 16, the tab 128 being to the extreme left in the illustrations of the drawing.

The electrical control system is shown in FIG. 4 and includes suitable motor on-off controls 150, the counting and recording circuits 152 used for measurements, a motor selector switching circuit 154 which selectively switches the motor power supplied by the on-off controls to either the forward motor 56 or a reverse motor 156, both of which are coupled to a common drive shaft 158 connected to the driving gear train 58,60 shown in FIG. 2. The motor selector switching circuit 154 is actuated from its normal position, conducting power to the forward motor 56, to its reverse motor position by a signal from the shutter cam sensing switch SCS through a normally open gate 160 which is closed by an inhibit signal from the shutter arm-sensing switch SAS shown at 162. At a point in the operating cycle (later discussed) the motor selector reset circuit 164 provides a resetting signal which returns the motor selector switching circuit 154 to the normal forward motor position if it had, for reasons which will be discussed below, been switched to the reverse motor position. The motor selector circuit 154 and the reverse motor 156 together with the switches SCS and SAS and the motor selector reset circuit 164 provide, in combination with the camming members 108 and 120, a novel system of rejecting a sample bottle or vial which, because of improper size or shape or other reason, jams in the aperture to the passage 16 preventing the shutter 132 from reaching its closed position. As will be described in greater detail hereinafter, the jammed sample bottle is lifted back to the conveyor 10, the next successive sample bottle being then deposited on the elevator at the access aperture to the passage 16 and the normal operation of the sample changer continues without impairment.

In now describing the operation of the apparatus, it may be assumed as a starting point that a sample bottle is disposed within the counting chamber 18 supported on the platform 25 at the upper end of the elevator ram 24. The elevator timing cam 122 in this position has actuated the lower limit switch LLS providing a stop signal to the motor controls 150 which cuts off the motor 56, and providing a start-count signal to the count and record circuits 152. The cam condition is shown in FIG. 4. At the completion of the counting measurements, the circuits 152 transmit a start-after-count signal through lead 153 to the motor controls 150, starting the forward motor 56 through the coupling 166 and the motor selector switch 154. The motor 56 drives the shaft 158 in the forward direction which drives the drive shaft 104 through the gear train 58, 60 (FIG. 2) rotating the cam assembly in the clockwise direction as indicated by the arrows in FIG. 4. In the position there shown, corresponding to the bottom or lowermost position of the elevator, the follower roller 90 is in engagement with a circularly curved portion 106 of the cam member 96 and the follower roller 92 is in engagement with a circularly curved portion 168 of the cam member 98 and since both follower rollers 90 and 92 are on circularly curved portions of the camming surfaces, a dwell is provided as shown at the left of the elevator cam cycle in the timing diagram of FIG. 5. To provide the proper and essential reproducibility of the positioning of the elevator when the sample vial is disposed within the counting chamber 18, the cams 96 and 98, and their followers 90 and 92, are designed and adjusted so that both followers securely engage their respective cams. Were this not done, i.e., were either follower out of contact with its cam, any vibration or similar cause would cause shift of elevator position, since lack of contact by either follower will be seen to create ambiguity of relation between cam position and elevator position, the "-play" at the cams being multiplied by the leverage factor of the drive arm.

As the cam 94 rotates in the clockwise direction, the relatively flat portion 170 of the cam 96 begins to drive the follower roller 90 rotationally about the axle 42 producing a rise of the elevator ram for approximately 60° of shaft rotation or 80° from the initial bottom position. During this first rise portion of the cycle, as the follower roller 90 is being driven by the cam member 96, the locking double-engagement which was provided by the cam and follower assembly in the zero position corresponding to the lowermost position of the elevator, is deliberately avoided in the design of the cams and, as shown in FIG. 11, the follower roller 92 now rides at a small distance D from the surface of the cam member 98, such distance representing a clearance for absorbing reasonable manufacturing dimensional tolerances of these portions of the cams. By leaving such a clearance in the regions of motion of the ram, corresponding to radius gradients of the cams, the holding of close dimensional tolerances in the stationary dwell regions, which is rendered simple by the circular arcs in these regions, achieves all the necessary precision at relatively small cost. This clearance is of course obtained by having the distance between contact points (in the plane of rotation) maximum in the dwell or constant-radius portions of the cams.

Assembly adjustment of the distance between the rollers is provided by rotation of the eccentric bushing 91 which mounts the roller 90, and is made in the lowered position of the elevator. The exact position to which this corresponds is adjusted by rotation of the lever arm with respect to the bell crank produced by rotation of the adjustment screw 86, which has its shaft portion 180 eccentrically related to its head portion.

The rotation of the drive shaft 104 rotates the shutter actuator cam 108. The angular disposition of the cam 108 and its follower 110 with respect to the conjugate cam 94 is illustrated in FIG. 4 and the corresponding relative timing relation is shown in FIG. 5. As the main elevator cam reaches an intermediate dwell position in the upward stroke of the elevator ram at about 80° of shaft rotation, the light seal in the vertical passage is established, and the shutter actuator cam 108 commences to drive the shutter actuator arm 54 against the tension of the spring 112, sliding back the shutter blade 132 until the shutter aperture 146 is concentrically disposed with the passage aperture 14.

The shutter cam-sensing switch SCS is actuated by cam 120 at the point of 85 degrees of shaft rotation, shortly after the commencement of opening of the shutter. The elevator ram 24, which has meanwhile remained stationary, is then again driven upwardly until the upper dwell position is reached at approximately 160° of shaft rotation. The upper limit switch ULS is actuated by the elevator position timing cam 122 to stop the motor. It will of course be seen that the relatively long dwell periods on the elevator cams make adjustment for exact timing of the operation of the upper and lower limit switches unnecessary, the term "limit switches" in this case merely indicating correspondence to the function heretofore served by switches actually controlling the limit of motion, and thus requiring position adjustment.

After changing of sample vials, the usual external "start down" signal is supplied to the motor on-off controls 150 and the cycle proceeds. As seen from FIGS. 4 and 5, the second half of the cycle is in essence a "mirror image" of the first half, the occurrences therein being the exact reverse of those already described, both as to sequence and timing. However, as will now be discussed, this latter half of the cycle is interrupted and itself reversed in the event a sample vial, due to oversize, cap protuberance, or other fault, becomes jammed in the passage.

In the event of such jamming, the shutter blade 132, which would then normally be brought into its closed position by the tension of spring 112, moves slightly toward that position as shown in FIG. 9, but is stopped by the vial. The shaft 104 continues to rotate but the roller 110 no longer follows the cam 108, and remains in the outward position and fails to operate the arm-sensing switch SAS. Thus the operation of switch SCS, when it shortly occurs, switches the motor selector and transfers the motor power to the reverse motor drive 156, and shaft 158 now rotates in a reversed direction. The shutter shortly reopens. The elevator platform 25 is then still positioned within the passage 16 with the light-seal assembly 70 engaged with the passage wall, the elevator cam being in the intermediate dwell position, but shortly raises the elevator ram 24 to engage the bottom portion of the jammed sample vial and return it to the top. The switch ULS then operates in the same manner as in normal operation, and in addition restores normal operation by the signal to the motor selector reset 164.

The spring 112 is of course selected to produce no hazard of damaging the shutter or the vial in the event of occurrence of a jammed sample. The present jammed sample rejection provision accordingly guards against damage resulting from a jammed sample without making it necessary to provide a motor drive which is of controlled limited force, as is required where the jamming of a sample stalls the motor. Although this aspect of the invention may also be employed with other forms of drive for the elevator, it is particularly advantageous with the present type of elevator drive.

It will be obvious to persons skilled in the art that many modifications of the specific device illustrated in the drawing may be made, some immediately obvious and others observable after study, which differ greatly in detail from the particular construction shown, but nevertheless employ the teachings of the invention in its various aspects. Although the invention is most advantageously employed in the overall combination of novel features employed in liquid scintillation counting, it will further be obvious that particular features may advantageously be employed individually, either in the devices for the same purpose or in devices for analogous purposes. Accordingly, the scope of the patent protection to be afforded the invention should not be confined to the particular embodiment illustrated and described above, but should extend to the structures defined in the appended claims and equivalents thereof.

What is claimed is:

1. In a sample-handling mechanism for liquid scintillation counting comprising wall means defining a chamber, a detector responsive to light appearing within the chamber, an elongated vertical passage terminating in an upper access aperture and connecting the chamber therewith, a sample-holder assembly movable through the passage and driving means for successively raising the holder assembly from a lower position wherein a sample is positioned within said chamber to an upper position wherein a sample is positioned external of said access aperture, and lowering said holder assembly from said upper position to said lower position, the improvement characterized by said driving means comprising a lever engaging the holder assembly at the bottom end, a cam and follower assembly comprising rotatable camming surface portions engageable with a follower assembly at two respective points fixedly spaced apart on the follower assembly, said follower assembly directly driving said lever, one of said points of engagement driving the holder down and the other driving the holder up, and said camming surface portions being contacted by the follower assembly at both fixedly spaced points during the lowermost portion of the camming cycle and at only one of said points during portions of the cycle wherein the holder is moving, whereby complete reproducibility of the sample position in the chamber is achieved with camming surfaces having relatively large tolerances.

2. A sample changer according to claim 1 wherein said camming surface portions are located on separate parallel cam surfaces spaced in a direction normal to the plane of rotation.

3. A mechanism according to claim 1 wherein said camming surface portions in engagement with said follower assembly in said lowermost portion of the cycle are circularly curved to provide a dwell in that position.

4. A mechanism according to claim 1 further comprising a movable shutter having a closed position blocking entry of exterior light into said passage and an open position permitting access to said passage, a second rotatable cam and follower assembly, actuator means attached to said follower and said shutter for opening and closing the shutter at predetermined times during the operation of said driving means, and a spring attached to said actuator means for normally retaining said follower in engagement with said cam, the follower disengaging from the cam when the shutter is prevented from closing by a jammed sample.

5. A mechanism according to claim 4 further comprising control means for reopening said shutter and raising said holder assembly to its upper position in response to the failure of said shutter to close at the predetermined time of normal closing, whereby a sample which is jammed in the access aperture is rejected from the sample-handling mechanism.

6. In apparatus for liquid scintillation counting comprising a counting chamber, an elongated vertical passage terminating in an upper access aperture and connecting the chamber therewith, an elevator movable through the passage and driving means for cyclically raising and lowering the elevator to position samples, a light shutter at the top of the passage, a shutter-operating cam opening and closing the shutter as the elevator is raised and lowered, and means to detect the jamming of a sample in the shutter including means to produce a signal indicative of normal operation of the shutter, and to reverse the cam and raise the elevator if such signal is not produced, the improved construction characterized by:
a cam follower fixedly coupled to the shutter for motion therewith, yielding force means of relatively small force urging the shutter to the closed position and holding the cam follower against the shutter-operating cam, the cam opening the shutter against the force thereof, the shutter-closing portion of the cam surface departing from the follower upon jamming of a sample, said signal-producing means producing a normal operation signal in direct response to motion of the shutter and follower in following the shutter-closing portion of the cam surface, the cam-reversing means being operable during further motion of the cam.

7. The apparatus of claim 6 wherein the shutter-operating cam is rotary, and having a cam on a common shaft with the shutter-operating cam producing a signal shortly after the time of production of the normal operation signal, and means for inhibiting transmission of the second-occurring signal responsive to the normal operation signal, so that transmission of the second-occurring signal indicates jamming of a sample.

8. The apparatus of claim 7 having an elevator-operating cam on a common shaft with said other cams, the elevator-operating cam having a dwell in the time region of the operation of said other cams, so that the elevator then remains stationary.

9. The apparatus of claim 8 wherein the elevator cam is engageable with a follower assembly at two points fixedly spaced on the follower assembly, one of said points of engagement driving the elevator down and the other driving the elevator up, and said elevator cam contacting the follower assembly at both fixedly spaced points during a dwell portion of the camming cycle wherein the elevator is stationary and at only one of said points during portions of the cycle wherein the elevator is moving.